(12) United States Patent
Nowak et al.

(10) Patent No.: US 12,743,649 B2
(45) Date of Patent: Sep. 22, 2026

(54) HIGH DENSITY FIBER OPTIC PACKAGING FOR CRYOGENIC APPLICATIONS

(71) Applicant: Massachusetts Institute of Technology, Cambridge, MA (US)

(72) Inventors: William John Nowak, Waltham, MA (US); John D. Cummings, Stoneham, MA (US); Paul Benjamin Dixon, Arlington, MA (US); Ryan P. Murphy, Cambridge, MA (US); David Starling, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 755 days.

(21) Appl. No.: 18/320,016

(22) Filed: May 18, 2023

(65) Prior Publication Data

US 2023/0376818 A1 Nov. 23, 2023

Related U.S. Application Data

(60) Provisional application No. 63/343,254, filed on May 18, 2022.

(51) Int. Cl.
*G06N 10/40* (2022.01)
*G02B 6/42* (2006.01)

(52) U.S. Cl.
CPC ............. *G06N 10/40* (2022.01); *G02B 6/428* (2013.01)

(58) Field of Classification Search
CPC .......... G06N 10/40; G02B 6/428; G02B 6/30; G02B 6/3652
See application file for complete search history.

(56) References Cited

U.S. PATENT DOCUMENTS

| | | | |
|---|---|---|---|
| 4,998,803 | A | 3/1991 | Salour et al. |
| 5,703,973 | A | 12/1997 | Mettler et al. |

(Continued)

FOREIGN PATENT DOCUMENTS

| | | |
|---|---|---|
| WO | 2018182516 A1 | 10/2018 |

OTHER PUBLICATIONS

"Optical Fiber Could Boost Power of Superconducting Quantum Computers," Mar. 24, 2021, 3 pages (downloaded from https://www.nist.gov/news-events/news/2021/03/optical-fiber-could-boost-power-superconducting-quantum-computers on May 17, 2023).

(Continued)

*Primary Examiner* — Nha T Nguyen
(74) *Attorney, Agent, or Firm* — Smith Baluch LLP

(57) ABSTRACT

A quantum network may use long-lived quantum memories with optical interfaces incorporated into a scalable architecture. Color-center quantum emitters in diamond have emerged as a promising quantum-memory modality due to their optical properties and compatibility with scalable integration. Here, we disclose a cryogenically stable and network-compatible quantum-emitter module for use as a quantum memory. This quantum-emitter module includes a diamond microchiplet with quantum emitters in the form of silicon vacancies or other color centers. The diamond microchiplet is integrated with a silicon photonic integrated circuit (PIC), which is secured to a silicon bench with cryo-compatible epoxy. Waveguides in the PIC are butt-coupled to optical fibers in a silicon V-groove array, which is secured to the same silicon bench with more cryo-compatible epoxy. A fast-curing epoxy holds the V-groove array to the PIC while the cryo-compatible epoxy cures for mechanical stability from room temperature to cryogenic temperatures.

20 Claims, 10 Drawing Sheets

(56) References Cited

U.S. PATENT DOCUMENTS

| | | | | |
|---|---|---|---|---|
| 6,048,107 | A * | 4/2000 | Pubanz | G02B 6/4249 385/83 |
| 6,879,757 | B1 | 4/2005 | Zhou et al. | |
| 8,615,149 | B2 | 12/2013 | Kim et al. | |
| 11,631,960 | B2 | 4/2023 | Du et al. | |
| 12,259,579 | B1 * | 3/2025 | Dudley | G02B 6/305 |
| 2005/0094944 | A1 | 5/2005 | Silverbrook | |
| 2009/0067778 | A1 | 3/2009 | Kim et al. | |
| 2013/0301982 | A1 | 11/2013 | Lee | |
| 2016/0116688 | A1 | 4/2016 | Hochberg et al. | |
| 2018/0348431 | A1 * | 12/2018 | Bassett | G02B 6/132 |
| 2022/0146749 | A1 * | 5/2022 | Bandyopadhyay | G02B 6/125 |
| 2023/0118909 | A1 * | 4/2023 | Seyedi | G02F 1/025 385/14 |
| 2024/0013084 | A1 * | 1/2024 | Golter | G06N 10/40 |
| 2024/0220840 | A1 * | 7/2024 | Jacob | G02F 1/353 |

OTHER PUBLICATIONS

Chung, et al. "Design and implementation of the Illinois Express quantum metropolitan area network." IEEE Transactions on Quantum Engineering 3 (2022): 1-20.

Cui et al. Entanglement Distribution and routing in a Multi-node Quantum network Testbed, 2021 Conference on Lasers and Electro-Optics (CLEO). IEEE, 2021, 2 pages.

Du, et al. "An elementary 158 km long quantum network connecting room temperature quantum memories." arXiv preprint arXiv:2101.12742 (2021), 18 pages.

Lekitsch et al., "Blueprint for a microwave trapped ion quantum computer," Sci. Adv. 2017;3: e1601540 Feb. 1, 2017, 11 pages.

Levy et al., "Implications of electronics constraints for solid-state quantum error correction and quantum circuit failure probability," New Journal of Physics, 13 (2011) 083021, 18 pages.

Mehta, et al. "Integrated optical multi-ion quantum logic." Nature 586.7830 (2020): 533-537, 14 pages.

Monroe et al., "Large Scale Modular Quantum Computer Architecture with Atomic Memory and Photonic Interconnects," arXiv, 1208.0391, Jul. 2, 2013, 16 pages.

Mouradian et al., "Rectangular photonic crystal nanobeam cavities in bulk diamond," Applied Physics Letters 111, 021103 (2017), 5 pages.

Niffenegger et al. "Integrated multi-wavelength control of an ion qubit." Nature 586.7830 (2020): 538-542, 12 pages.

Starling et al., "A fully packaged multi-channel cryogenic quantum memory module," arXiv:2302.12919v1 [quant-ph], Feb. 24, 2023, 9 pages.

Wan et al. "Two-dimensional photonic crystal slab nanocavities on bulk single-crystal diamond." Applied Physics Letters 112.14 (2018), 5 pages.

Wan, et al. "Large-scale integration of artificial atoms in hybrid photonic circuits." Nature 583.7815 (2020): 226-231, 19 pages.

Zhong et al. "Effects of thermally induced optical fiber shifts in V-groove arrays for optical MEMS." Microelectronics Journal 36.2 (2005): 109-113, 6 pages.

* cited by examiner

422'
130
132
134
Diamond Transition
454
450
Window Transition
452
3 μm
422

132
422'
422
(i)
(ii)
(iii)
(iv)
(v)

FIG. 6
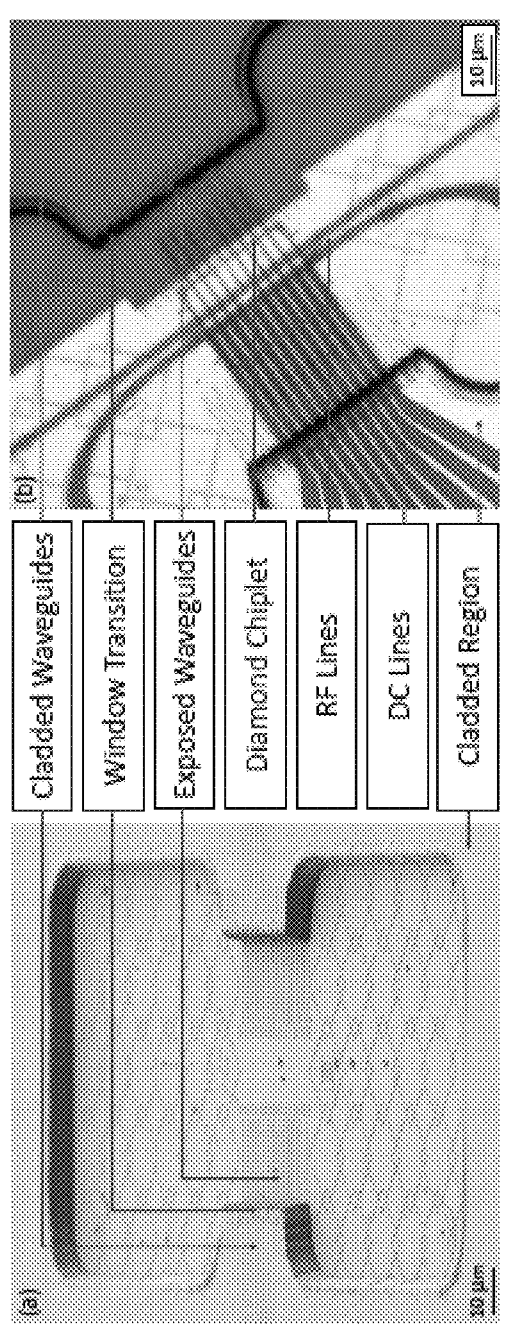
(a)
(b)
Cladded Waveguides
Window Transition
Exposed Waveguides
Diamond Chiplet
RF Lines
DC Lines
Cladded Region
10 µm
10 µm

HIGH DENSITY FIBER OPTIC PACKAGING FOR CRYOGENIC APPLICATIONS

CROSS-REFERENCE TO RELATED APPLICATION(S)

This application claims the priority benefit, under 35 U.S.C. 119(e), of U.S. Application No. 63/343,254, filed May 18, 2022, which is incorporated herein by reference in its entirety for all purposes.

GOVERNMENT SUPPORT

This invention was made with government support under FA8702-15-D-0001 awarded by the U.S. Air Force. The government has certain rights in the invention.

BACKGROUND

Quantum memory systems scaled to tens or hundreds of memories with millisecond-class coherence times could enable quantum repeater functionality for quantum networks. There are multiple candidate qubit platforms for networked quantum memory use, including trapped ions, trapped neutral atoms, atomic ensembles in vapors, atomic ensembles in solid-state materials, and individual color centers in solids. Diamond color-center emitters have emerged as a particularly promising platform due to several beneficial characteristics. Their coherent optical interface provides compatibility with optical fiber networks. They have the potential to scale to thousands of memory qubits through on-chip integration, and their electron spin degree of freedom can exhibit coherence times ranging from milliseconds to seconds, providing utility as quantum repeaters and for quantum network applications. Furthermore, ancillary nuclear spins can be used as logical registers for multi-qubit processing, such as error detection and correction. However, the challenges of engineering a robust and scalable memory module has limited the use of these memories in network testbeds, delaying demonstration of advanced quantum network applications.

SUMMARY

A robust, packaged quantum-emitter module can be used as a quantum memory for a quantum network. Such a quantum-emitter module can include a silicon-nitride ($Si_3N_4$, SiN) photonic integrated circuit (PIC) that is heterogeneously integrated with a matched diamond microchiplet that contains quantum emitters in the form of negatively charged silicon vacancy ($SiV^-$) color centers in diamond waveguides. The PIC is mated to an array of optical fibers using a precision fiber alignment and bonding process. An inventive multi-emitter module is fully packaged, cryogenically compatible, scalable, and can be readily integrated into a quantum network.

A fiber block-chip assembly for a quantum-emitter module or other device can be made by bonding a PIC made of substrate material (e.g., silicon) to a support structure made of the (same) substrate material with a first portion of cryo-compatible epoxy. Next, optical fibers in a V-groove array made of the (same) substrate material are aligned to waveguides in the PIC, then the V-groove array is bonded to the support structure with a second portion of cryo-compatible epoxy and to the PIC with epoxy having a shorter cure time than the cryo-compatible epoxy (e.g., ultraviolet (UV)-curable epoxy). The epoxy is cured (e.g., by illumination with UV light) to secure the V-groove array to the PIC, then the first and second portions of cryo-compatible epoxy are cured (e.g., at room temperature).

Bonding the PIC to the support structure may include bonding the PIC to a shim made of the (same) substrate material with the first portion of cryo-compatible epoxy and bonding the shim to the support structure with a third portion of cryo-compatible epoxy. In this case, the second portion of cryo-compatible epoxy forms a layer of approximately equal in thickness to a sum of a thickness of a layer formed by the first portion of cryo-compatible epoxy and a thickness of a layer formed by the third portion of cryo-compatible epoxy.

Aligning the optical fibers in the V-groove array to the waveguides in the PIC comprises sensing light coupled through one or more (loopback) waveguides in the PIC.

Bonding the V-groove array to the support structure can include moving the V-groove array away from the PIC after aligning the optical fibers in the V-groove array to the waveguides in the PIC. Then the second portion of cryo-compatible epoxy is applied to at least one of a surface of the V-groove array or a surface of the support structure. Then the optical fibers in the V-groove array are re-aligned to the waveguides in the PIC.

If desired, a diamond microchiplet or another component can be integrated with the PIC. Integrating the diamond microchiplet with the PIC can include aligning a waveguide in the diamond microchiplet to a waveguide in the PIC.

The completed fiber block-chip assembly includes a support structure made of substrate material; a PIC made of the substrate material, comprising a plurality of waveguides, and bonded to the support structure with cryo-compatible epoxy; a V-groove array made of the substrate material, holding a plurality of optical fibers, and bonded to the support structure with additional cryo-compatible epoxy; and epoxy (e.g., UV-curable epoxy) bonding the PIC to the V-groove array. The PIC can include one or more loopback waveguides for alignment of the waveguides in the PIC to the optical fibers held by the V-groove array. The epoxy can be index-matching epoxy. The fiber block-chip assembly may include a shim that is made of the substrate material, in which case the PIC can overhang the shim and the epoxy is not bonded to the support structure.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

Figure 4A:
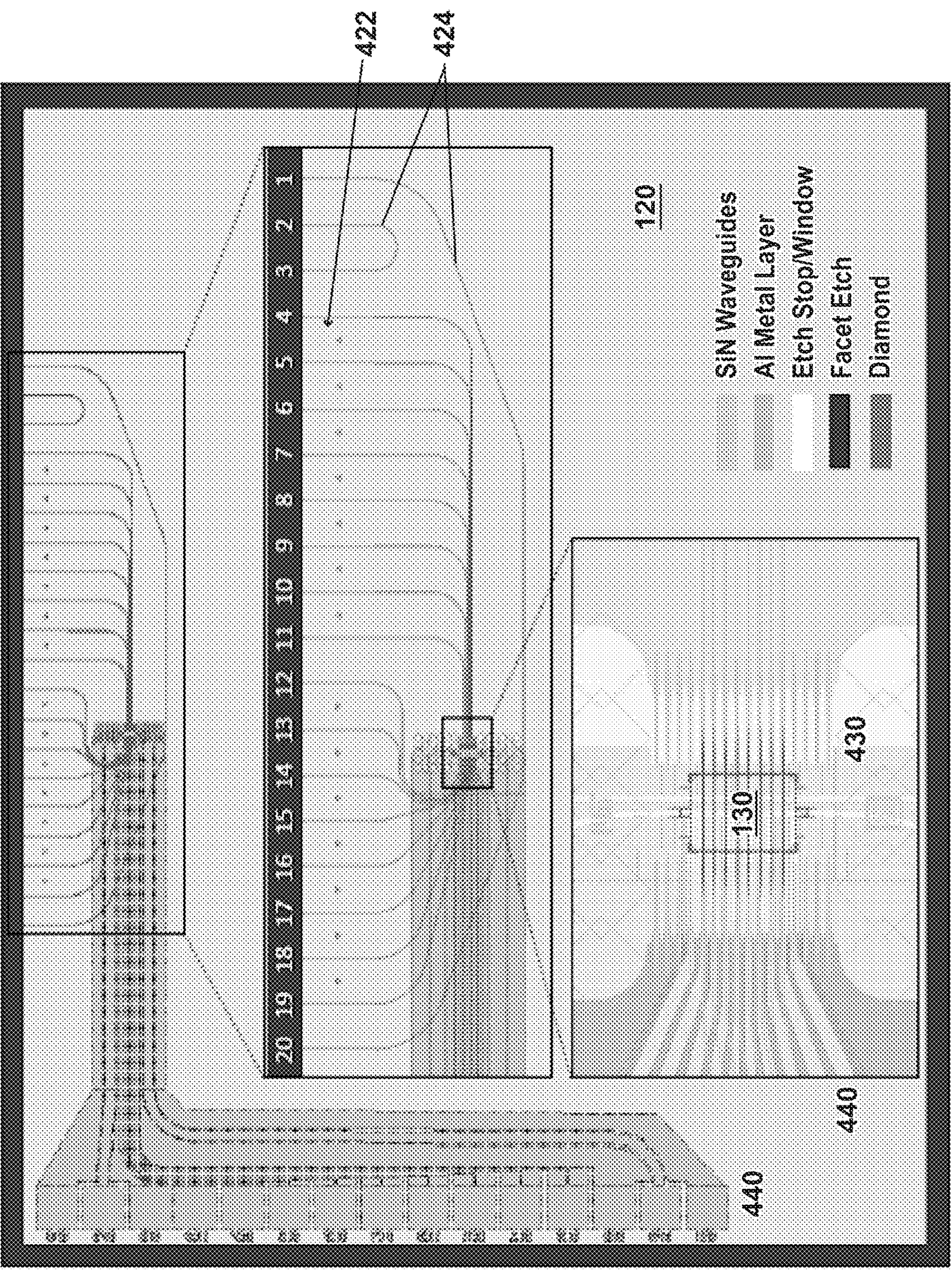

FIG. 4A shows the layout of a photonic integrated circuit (PIC) for a quantum-emitter module, with insets showing facets of the PIC with 10 optical input and 10 optical output channels (channels 1, 2, 3 and 20 are used for optical alignment of the 20-channel fiber array, while channels 4-19 are used for coupling light to and from the color centers in the diamond microchiplet) and a diamond integration region of the PIC with the diamond microchiplet.

Figures 4B, 4C:
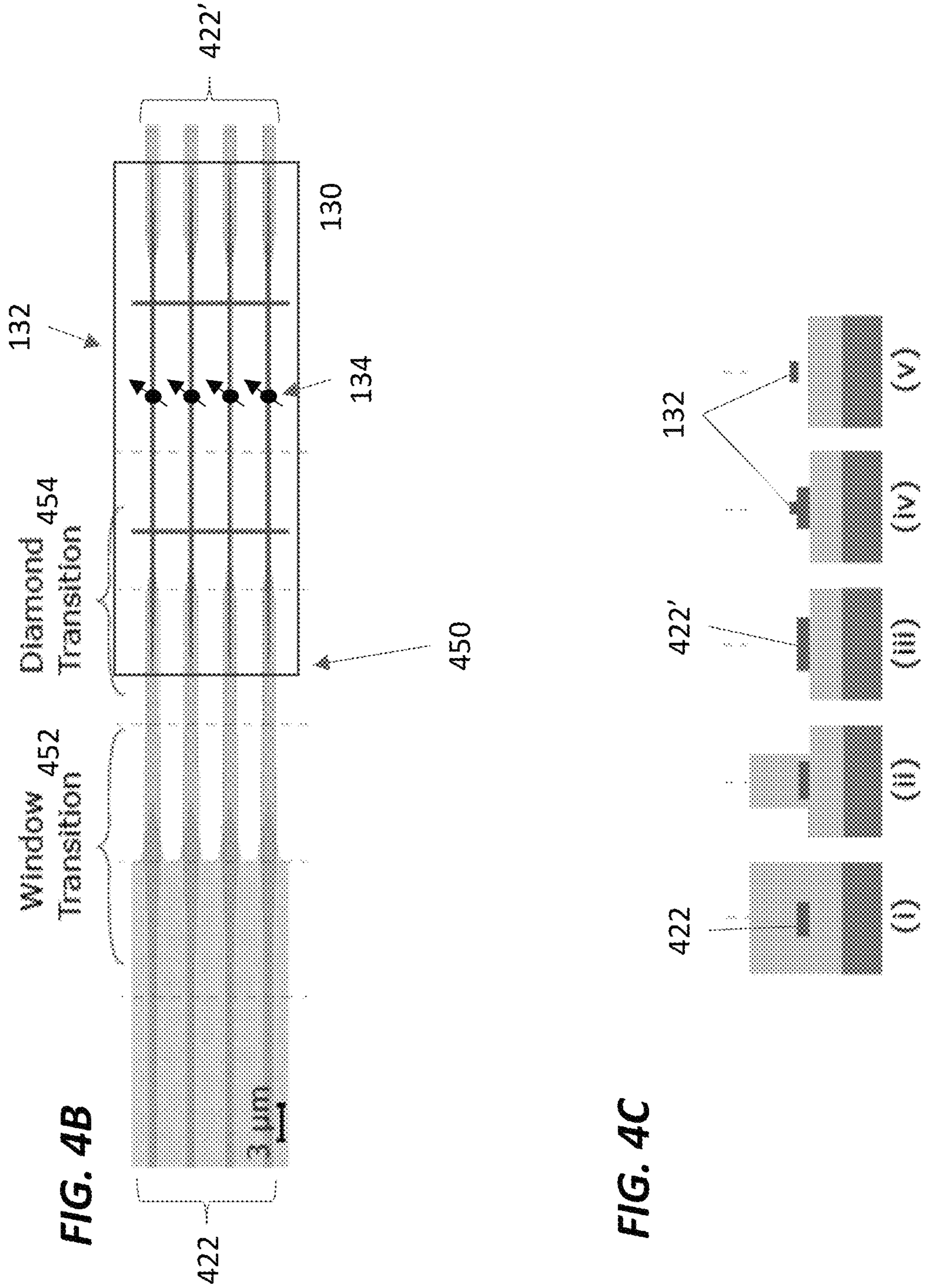

FIG. 4B shows a more detailed view of a portion of the diamond integration region of FIG. 4A.

FIG. 4C shows a cross section of the portion of the diamond integration region shown in FIG. 4B.

Figure 5:
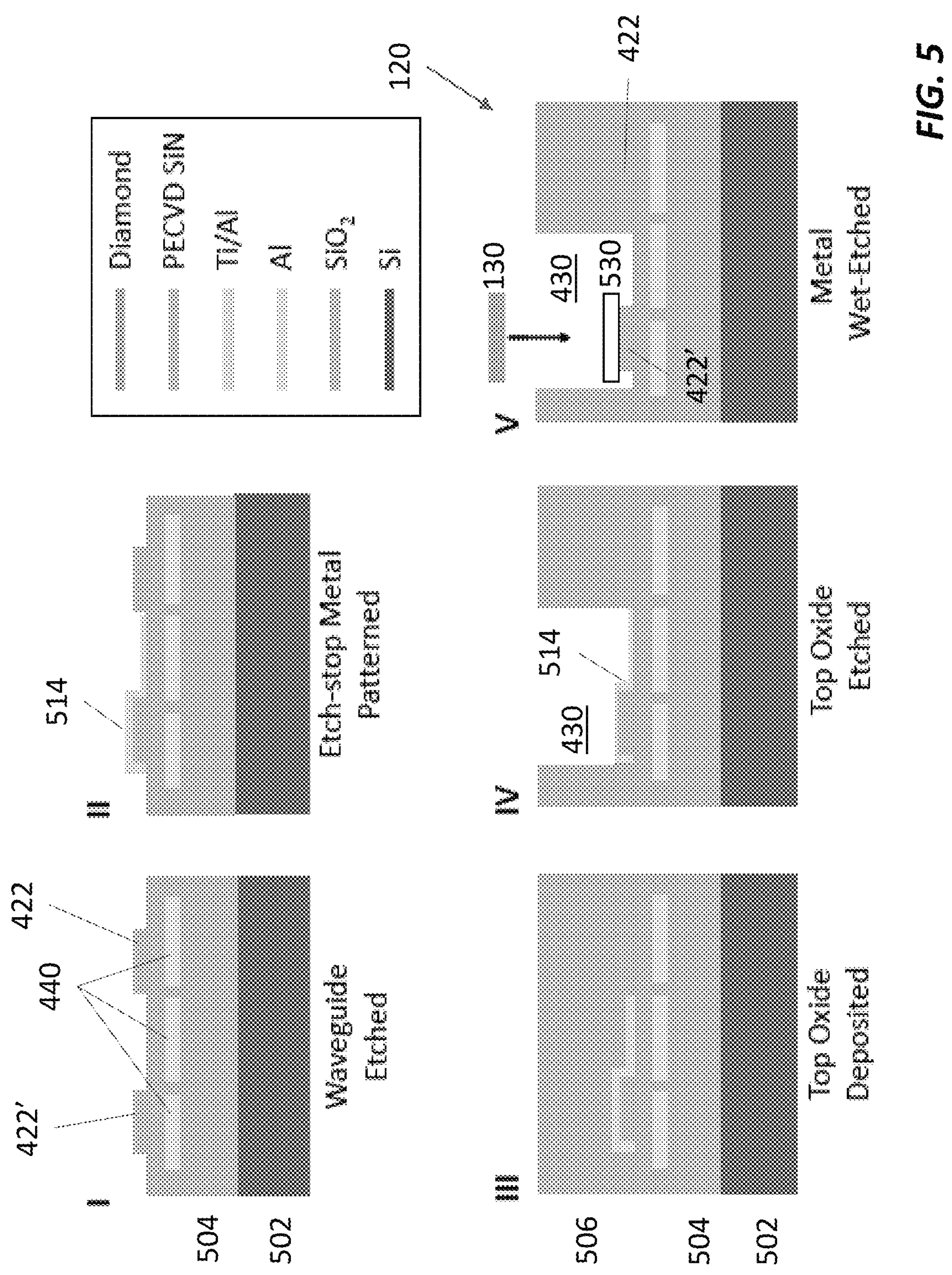

FIG. 5 shows a process for making an opening or window for the diamond integration region in a PIC.

FIG. 6 shows a scanning electron microscope (SEM) image (left) of the window in a diamond integration region in a PIC and an optical image (right) of a diamond microchiplet containing quantum emitters and integrated into the window.

Figure 7:
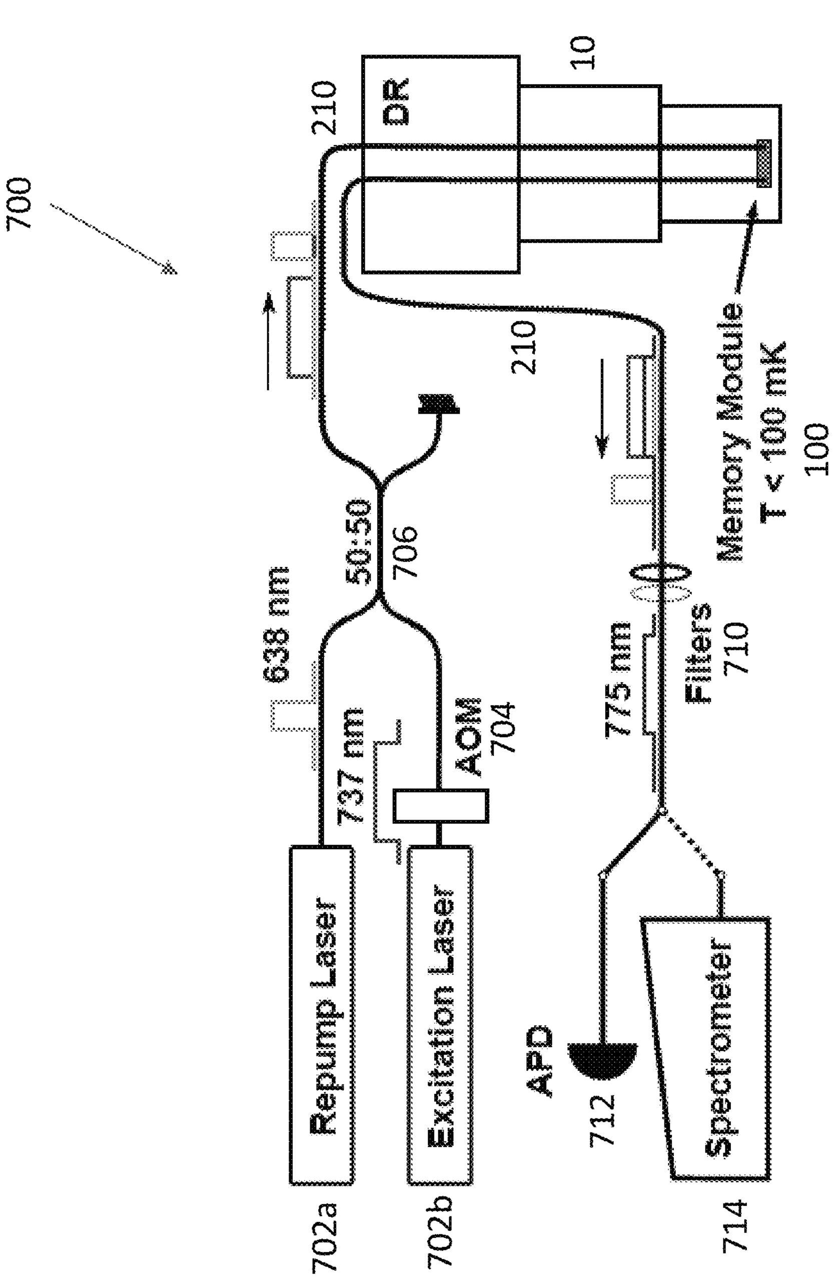

FIG. 7 shows an experimental setup for characterizing a quantum-emitter module.

Figures 8A, 8B, 8C, 8D:
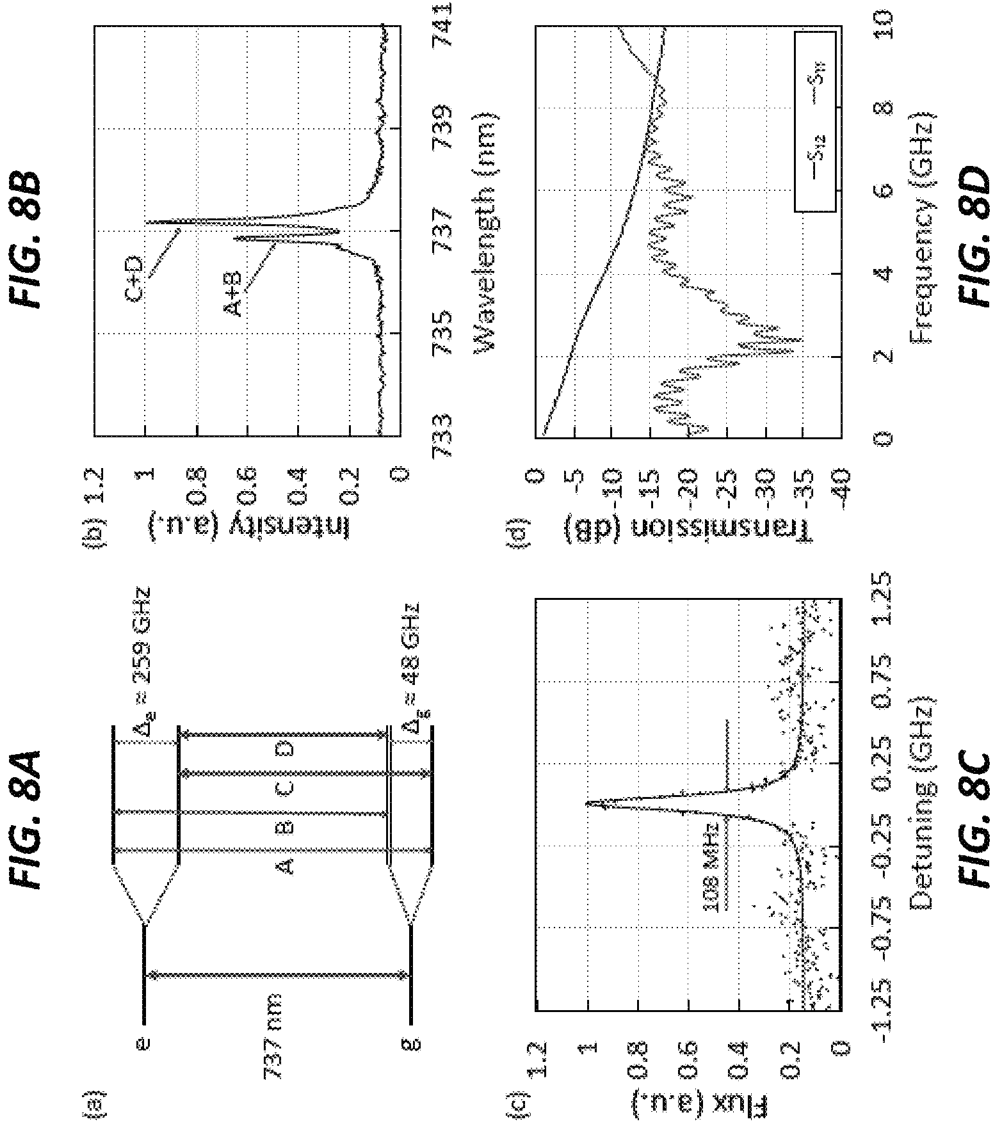

FIG. 8A shows an energy level diagram of a $SiV^-$ color center (quantum emitter) with zero magnetic field. The excited state (e) and ground state (g) are split by spin-orbit coupling. The resulting manifold contains optical transitions and microwave transitions.

FIG. 8B shows the spectrum of a typical photoluminescent (PL) signal from an ensemble of color centers in a single waveguide in a quantum-emitter module using 638 nm excitation light with transitions labeled according to FIG. 8A.

FIG. 8C is a high-resolution photoluminescent excitation (PLE) scan of one $SiV^-$ in the quantum-emitter module using resonant 737 nm and 638 nm repump laser light and collecting the phonon sideband.

FIG. 8D shows S-parameters of the microwave transmission properties of a quantum-emitter module.

Figure 9:
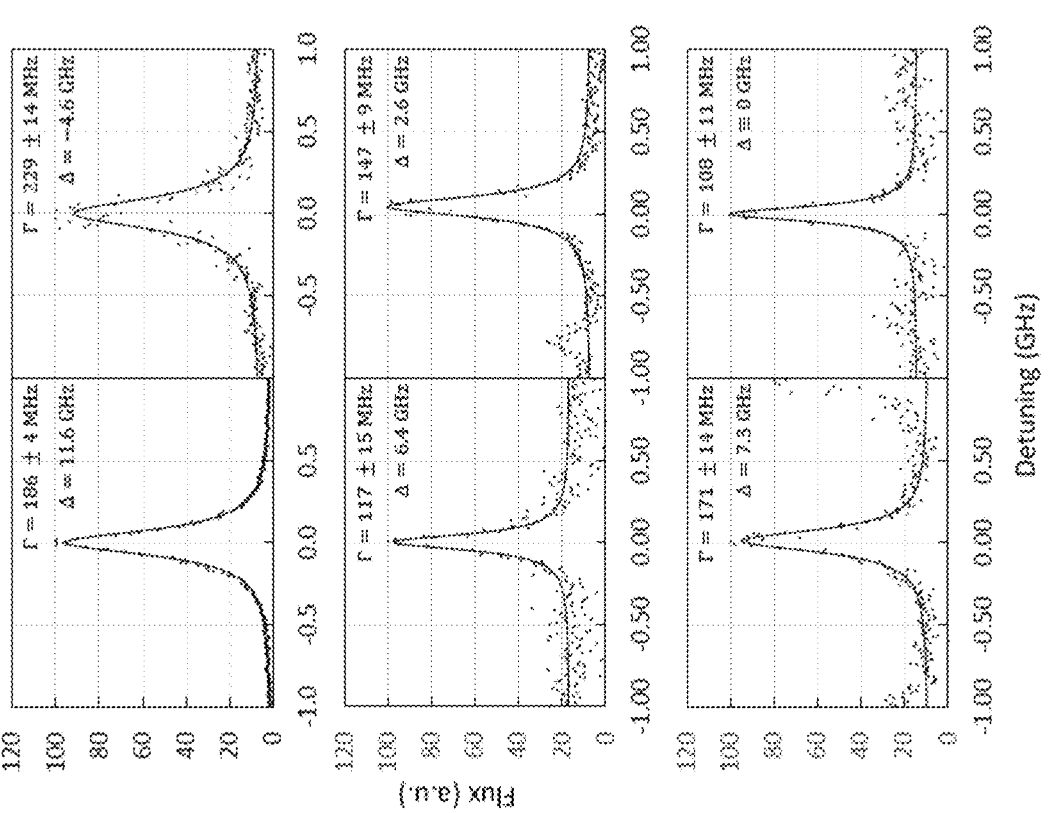
Figure 9:

FIG. 9 shows PLE scans of six diamond channels in the quantum-emitter module; the optical shift (horizontal axis) is relative to the channel shown in FIG. 8C.

DETAILED DESCRIPTION

A quantum-emitter module provides low-loss coupling between multiple optical fibers and an integrated photonics system in a package that is robust to cryogenic temperature operation. It addresses the long-standing problem of reliable and low-loss optical packaging for cryogenic operation of optical and photonic systems, and eliminates the need for bulky, non-scalable, and time-consuming active optical alignment inside the cryogenic system. It is especially useful for high-density, low-loss, packaged optical fiber interfaces to integrated photonics systems that operate in cryogenic temperatures, including quantum networks and quantum information systems. High-density optical access to cryogenic devices structures can be an enabling component of devices and systems that leverage photons in cryogenic environments. For instance, packaged optical fiber interfaces with optical insertion losses that change less than 1 dB when cooled to cryogenic temperatures can be used for photonic control of solid-state or photonic qubits in addition to quantum memory. They can also be used for fiber-coupled, cryogenically cooled photodetectors (e.g., superconducting photodetectors). The packaged optical fiber interfaces and packaging processes disclosed here can also be used for high temperatures operation, e.g., up to the threshold at which the epoxies break down, without excessive changes in optical insertion or propagation loss.

Cryogenically Packaged Quantum-Emitter Module

Figure 1:
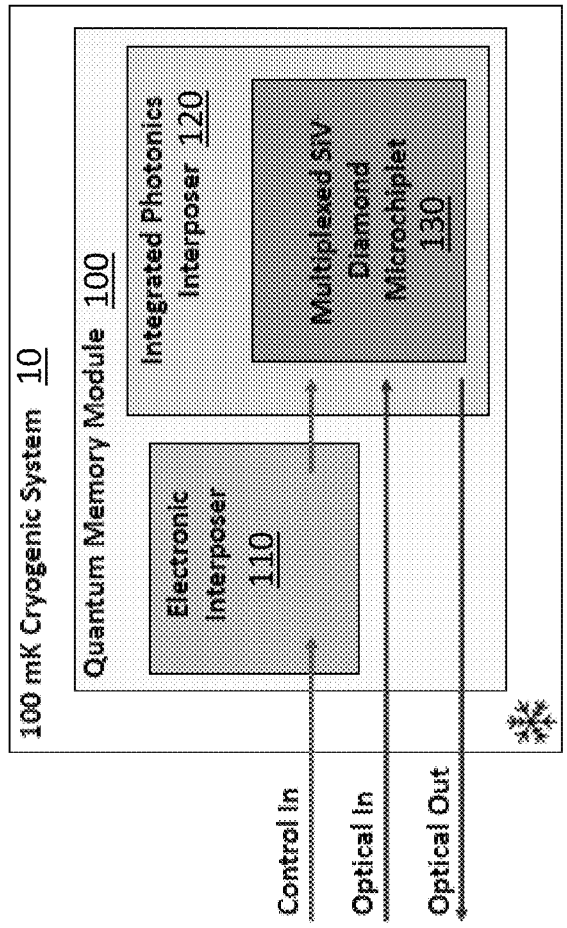
FIG. 1 illustrates a quantum-emitter module in a cryogenic refrigerator.

FIG. 1 shows a cryo-compatible, fully packaged quantum-emitter module 100, also called a quantum-memory module, that interfaces optical fiber with one or more controllable quantum emitters. The quantum-emitter module 100 includes a custom electronic interposer 110, an integrated photonic interposer (implemented as a photonic integrated circuit (PIC)) 120, and a multiplexed $SiV^-$ diamond microchiplet 130. The quantum-emitter module 100 is in a dilution refrigerator 10 that can operate at cryogenic temperatures (e.g., <1 K, <500 mK, <100 mK, <10 mK, or lower). In operation, microwave cables feed electrical control signals into the dilution refrigerator 10 to the electronic interposer 110, which routes the electrical control signals to the integrated photonics interposer 120, which in turn interfaces with the multiplexed $SiV^-$ diamond microchiplet 130 for qubit control. Optical fibers or other optical waveguides feed optical signals into the dilution refrigerator 10 via the same photonic interposer 120 to enable optical interaction with the multiplexed $SiV^-$ diamond microchiplet 130.

The optical and electrical connections within the quantum-emitter module 100 remain stable as the quantum-emitter module 100 cycles between room temperature (e.g., about 300 K) and cryogenic temperatures (e.g., about 100 mK), allowing optical coupling to and from quantum emitters in the diamond microchiplet 130 with an optical loss of 7 dB or less (e.g., 3, 2, 1, or 0.5 dB) even at cryogenic temperatures. That is, optical losses experienced by beams propagating to or from the PIC 120 remain unchanged or change by small amounts (e.g., <3 dB, <1 dB, or less) as the quantum-emitter module 100 cycles between room temperature and cryogenic temperatures. In addition, the quantum-emitter module 100 can be scaled to large numbers (e.g., tens to hundreds to thousands) of quantum emitters (color centers), e.g., by including more color centers in the diamond microchiplet 130, by integrating more diamond microchiplets 130 with the PIC 120, and/or including more PICs 120 in the quantum-emitter module 100.

Figures 2A, 2B, 2C:
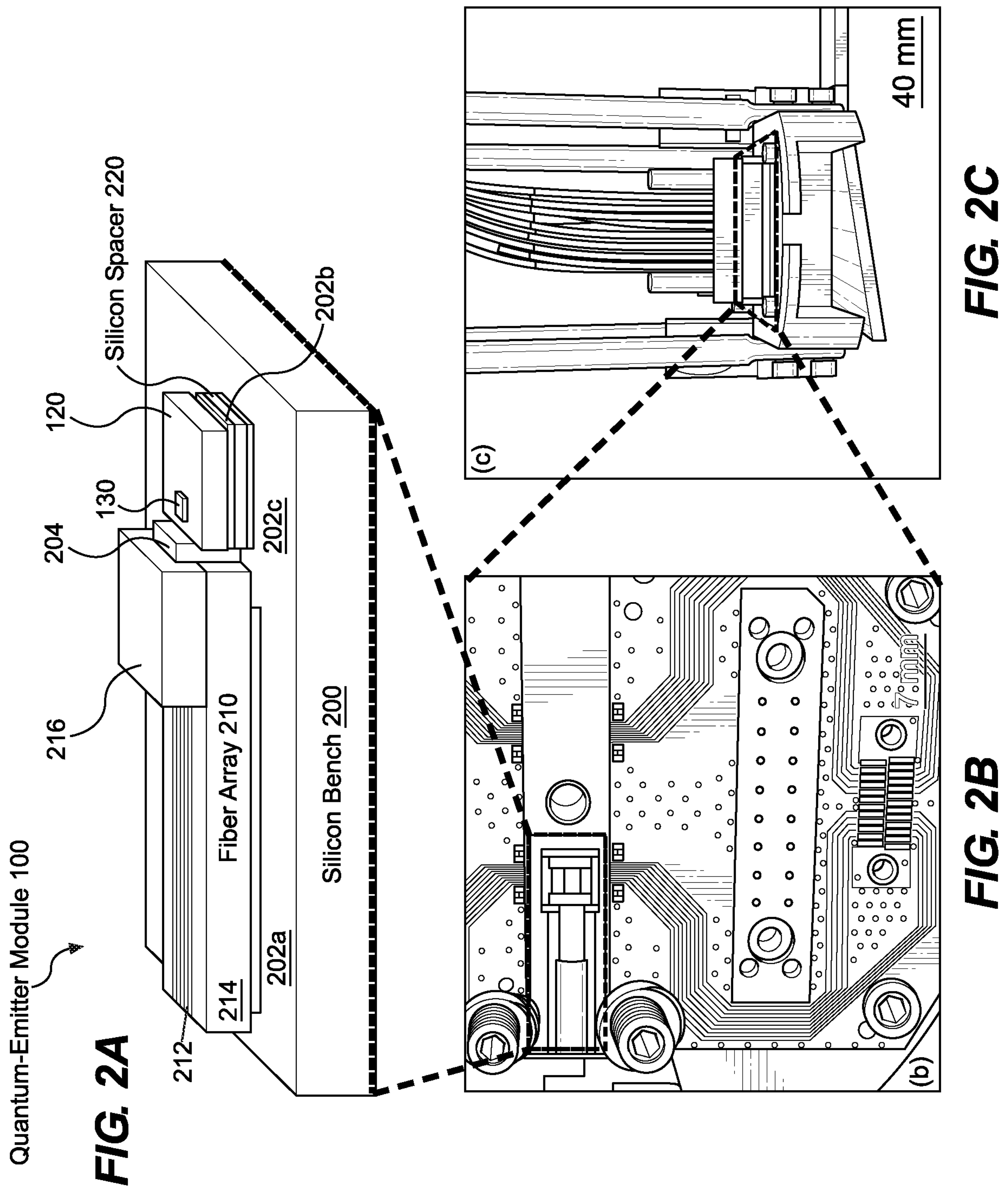
FIG. 2A illustrates the quantum-emitter module of FIG. 1 in greater detail.
FIG. 2B shows a fabricated quantum-emitter module affixed to a gold-plated copper puck and wire bonded to a printed circuit board (PCB).
FIG. 2C shows the fabricated quantum-emitter module of FIG. 2B mounted in a dilution refrigerator with microwave transmission cables and fiber array.

FIGS. 2A-2C shows the quantum-emitter module 100 in greater detail, including a fiber array 210 that couples optical signals into and out of the cryogenic environment (dilution refrigerator 10). The quantum-emitter module 100 can be affixed to a gold-plated copper puck and wire bonded to a printed circuit board (PCB) as shown FIG. 2B, then mounted in the dilution refrigerator 10 with microwave transmission cables as shown in FIG. 2C. Fiber feedthroughs for up to 40 fibers—supporting up to 16 diamond channels—enter the dilution refrigerator 10 through a single flange. Other quantum-emitter modules may have more or fewer fibers and/or diamond channels (e.g., tens, hundreds, or even thousands of fibers and diamond channels).

The PIC 120 and fiber array 210 are made of the same substrate material (here, silicon) bonded to a common support structure 200 made of that same substrate material and shown in FIG. 2A as a 725 μm thick silicon bench with transverse dimensions of 7 mm by 20 mm. The fiber array 210 includes optical fibers 212, which may be cleaved, tapered, or lensed, that rest in respective V-grooves in a silicon V-groove array 214. A lid 216 made of borosilicate glass (e.g., Pyrex) bonded to the V-groove array 214 helps to hold the optical fibers 212 in place. A first portion of cryo-compatible curable epoxy 202*a* (e.g., MasterBond EP21TCHT-1) bonds the flat side of the V-groove array 214 the silicon bench 200. The lid material has a coefficient of thermal expansion that is both low and close to the that of the substrate material used to make the V-groove array 214 in order to prevent the lid 216 from separating from the V-groove array 214 when the quantum-emitter module 100 is cooled to cryogenic temperatures.

The PIC 120 is thinner than the V-groove array 214, so it is bonded to one side of a 275 μm thick silicon spacer or shim 220 with a second portion of cryo-compatible epoxy 202*b*. The silicon shim 220, which may be 275 μm thick and have lateral dimensions of 7 mm by 5 mm, provides additional height for the cores of the optical fibers 212 to align with the facet of the PIC 120. A third portion of cryo-compatible epoxy 202*c* bonds the opposite side of the silicon shim 220 to the support structure 200. The silicon shim 220 can be omitted if the facet of the PIC 120 aligns to the V-groove array 214.

The quantum-emitter module 100 also includes epoxy with a shorter cure time than the cryo-compatible epoxy 202, such as ultraviolet (UV) curable epoxy 204 (e.g., Norland Optical Adhesive 63), between the fiber array 210 and the PIC 120. The UV-curable epoxy 204 is applied to the cleaved ends of the optical fibers 212, the face of the V-groove array 214, the lid 216, the facet of the PIC 120, and the side of the silicon shim 220 facing the fiber array 210. The UV-curable epoxy 204 holds these components in place while cryo-compatible epoxy 202 is cured as explained below. While UV-cured epoxy 204 alone can fail at cryogenic temperatures, the added support from the cryo-compatible epoxy 202 maintains the UV-cured epoxy bonds and keeps the quantum-emitter module 100 aligned. The UV-curable epoxy 204 also acts an index-matching optical interface between the optical fibers 212 and the waveguides at the facet of the PIC 120.

The PIC 120, silicon shim 220, and V-groove array 214 are all made of the same substrate material (here, silicon) and therefore have the same coefficient of thermal expansion. Likewise, the portions of cryo-compatible epoxy 202 are all the same type of cryo-compatible epoxy and have the same coefficient of thermal expansion. In addition, the total thickness of the PIC 120 and silicon shim 220 between the support structure 200 and the cores of the optical fibers 212 is approximately equal to the thickness of the V-groove array 214 between the support structure 200 and the cores of the optical fibers 212. Similarly, the total thickness of the second portion 202*b* and third portion 202*c* of cryo-compatible epoxy is approximately equal to the thickness of the first portion 202*a* of cryo-compatible epoxy (e.g., about 6 mils, or 0.006 inches). In other words, the total thicknesses of silicon between the optical fibers 214 and the support structure 200 are the same on both sides of the UV-cured epoxy 204, as are those of the cryo-compatible epoxy 202.

Because the materials between the optical fibers 214 and the support structure 200 on both sides of the UV-cured epoxy 204 have the same thickness and same coefficients of thermal expansion, they should contract, expand, and/or otherwise move by the same amounts and in the same fashions as the quantum-emitter module 100 is cooled and heated. This allows the optical fibers 214 to stay aligned to the facet of the PIC 120 as the quantum-emitter module 100 is cycled between cryogenic temperatures and room temperature, providing stable operation across a very wide temperature range (e.g., 300 K or more).

Figure 3:
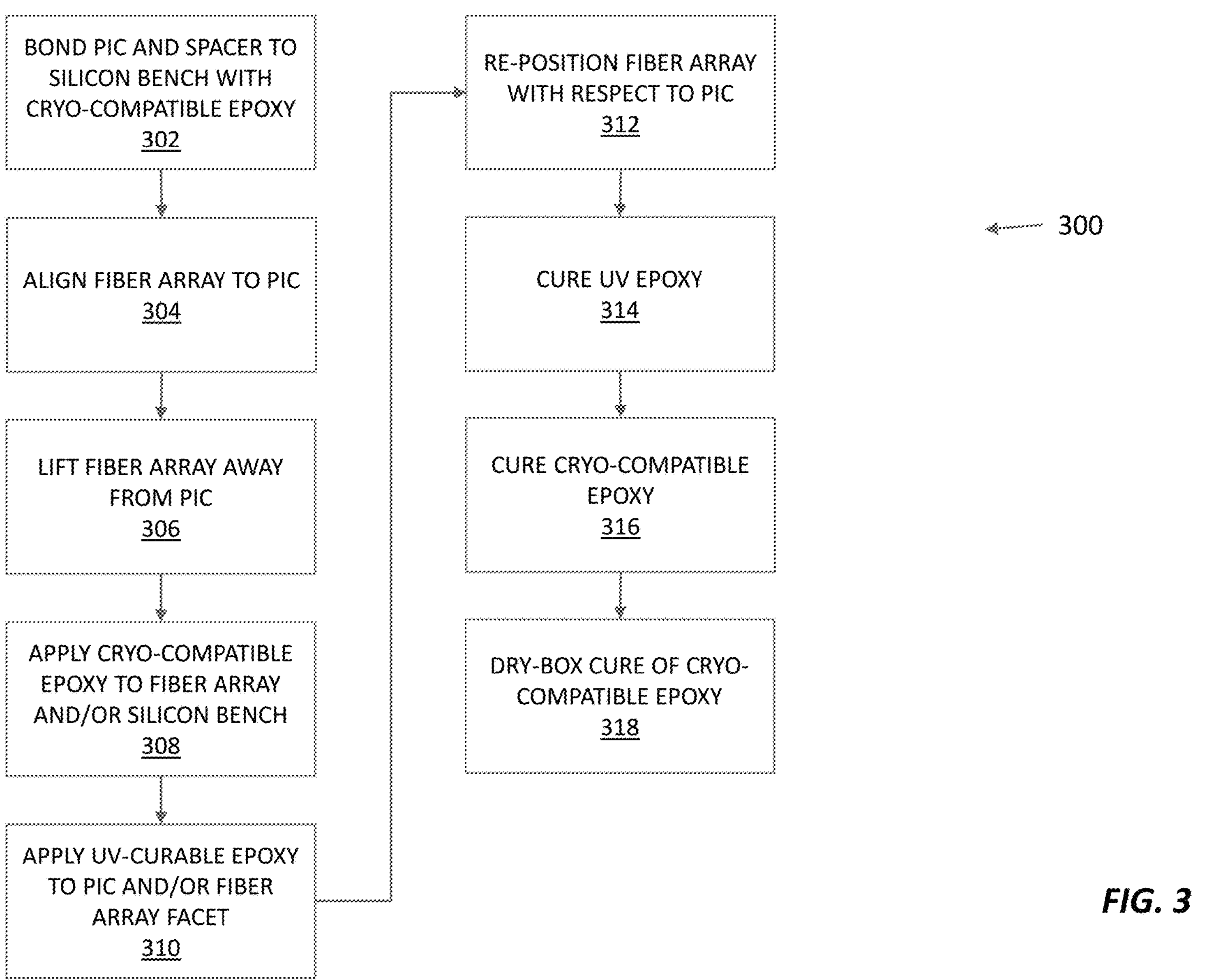
FIG. 3 illustrates a process for making a quantum-emitter module like those shown in FIGS. 2A-2C.

FIG. 3 illustrates a process 300 for aligning and assembling the components of the quantum-emitter module 100 shown in FIGS. 2A-2C. To start, the PIC 120 and silicon shim 220 are bonded to the support structure 200 with the second and third portions of cryo-compatible epoxy 202*b*, 202*b* (302). The cryo-compatible epoxy is mixed or otherwise prepared, then used to adhere the silicon shim 220 to the support structure 200. The cryo-compatible epoxy typically takes hours to days (e.g., 24 hours, 36 hours, 48 hours, 96 hours, or longer) to cure completely, so it and the components that it is applied to can be manipulated or shifted for several hours after it has been applied.

After the cryo-compatible epoxy cures at room temperature for about one hour to a partially cured state, the PIC 120 is adhered to the silicon shim 220 with some of the same batch of prepared/mixed cryo-compatible epoxy and allowed to cure for another hour. Because the cryo-compatible epoxy applied to the PIC and the shim 220 are from the same batch (i.e., mixed at the same time) and kept in the same conditions, they should cure at the same rate and finish curing at the same time. Alternatively, the PIC 120 can be bonded to the silicon shim 220 first, then the silicon shim 220 can be bonded to the support structure 200. Similarly, the fiber array 210 could be bonded to the support structure 200, then the PIC 120 could be aligned to the fiber array 210 and bonded to the fiber array 210 and support structure 200.

A jig holds the support structure 200, shim 220, and PIC 120 in place during assembly to ensure that they are aligned precisely to each other. Using a jig and spacers (e.g., made from plastic shim stock) makes it possible to maintain a bond line of cryo-compatible epoxy (e.g., measuring approximately 76 μm) for each layer or portion 202*b*, 202*c*. Applying pressure to the assembled components ensures that the PIC 120, silicon shim 220, and support structure 200 are parallel to each other.

Next, the PIC 120, silicon shim 220, and support structure 200 are positioned in a three-axis stage and aligned to the fiber array 210, which is temporarily mounted on a six-axis translation stage (304). The six-axis translation stage may be mounted on a rigid fixture that provides strain relief to the fibers 212 and can release the fiber array 210 after curing is complete without disturbing the alignment. The fiber array 210 can be aligned to the PIC 120 with a high-magnification optical microscope and viewing camera. Light from a 730 nm diode laser with a polarization controller or other suitable light source propagates through (some of) the optical fibers 214 to the PIC 120. Loopback alignment structures (described below) in the PIC 120 couple (some of) this light back into to optical fibers 214 for detection, ensuring accurate alignment across the entire facet.

Once aligned, the six-axis translation stage raise the fiber array 210 out of the way (306) so that cryo-compatible epoxy can be applied to the support structure 200 beneath the fiber array 210 (308) and UV-curable epoxy can be applied to the facet and/or the fiber array 210 (310). The UV-curable epoxy gap fills the gap between the fiber array 210 and the PIC 120, which overhangs the silicon shim 220 slightly, but does not contact or bond to the support structure 200. This allows the UV-curable epoxy to push the fiber array 210 and the PIC 120 together and/or pull them apart as the quantum-emitter module 100 is cooled or heated without placing additional strain or stress on the support structure 200. The fiber array is then lowered back into position with respect to the PIC 120 (312), and the alignment between the PIC 120 and fiber array 210 is optimized. Shining UV light on the UV-curable epoxy for approximately 60 minutes cures the UV-curable epoxy (314), securing the PIC 120 and fiber array 210 to each other. The cryo-compatible epoxy is allowed to cure (316) in the alignment setup for 24 hours, then transferred to a dry box for an additional 48-hour period of curing at room temperature (318). The cryo-compatible epoxy applied to the fiber array 120 is from the same batch applied to the PIC 120 and the shim 220 and kept in the same conditions, so it should cure at the same rate and finish curing at the same time as the portions applied to the PIC 120 and the shim 220.

Even though UV-curable epoxy generally isn't rated or specified for cryogenic use, it has several beneficial features for making quantum-emitter modules and other optical fiber interfaces for cryogenic operation. First, it cures at room temperature faster than the cryo-compatible epoxy (e.g., within 60 minutes, 10 minutes, 5 minutes, 1 minute, or less), so it can be cured before the components drift. And because it cures so quickly, it can be used to hold the components rigidly in place while the cryo-compatible epoxy cures. Second, because it is cured with UV light, it is possible to control when the UV-curable epoxy is cured and, by adjusting the UV light intensity, how quickly it is cured. This allows the fiber array 210 and PIC 120 to be (re-)aligned after the UV-curable epoxy has been applied but before it has been cured. Once the components are aligned properly, the UV-curable epoxy can be cured quickly. Third, the UV-curable epoxy is transparent at wavelength(s) of interest, whereas cryo-compatible epoxies typically are not. Indeed, the UV-curable epoxy acts as an index-matching layer between the fiber array 210 and the PIC 120.

The process 300 in FIG. 3 can be used or adapted to assemble any combination of height-matched and thermal-expansion-matched components into an optoelectronic module that is mechanically and optically stable down to cryogenic temperatures. For instance, this process 300 allows for a fiber array to be affixed to the same vertical plane as an integrated photonics edge coupler array, using one or more epoxies and a process of curing the epoxies that maintains optical alignment. The quantum-emitter module 100 can also be made with a substrate material besides silicon, so long as that material has a coefficient of thermal expansion that is comparable to the coefficient of thermal expansion of the (cured) cryo-compatible epoxy over the 0-300 K range. (If the coefficients of thermal expansion for substrate material and the epoxy are too different, the substrate material and cryo-compatible epoxy could separate at low temperatures.) Instead of silicon, for instance, the PIC, shim/spacer, V-groove array, and bench can all be made of sapphire or another suitable substrate material, such as a III-V semiconductor. The PIC, shim/spacer, V-groove array, and bench can even be made of different materials provided that those materials have the same coefficient of thermal expansion over the expected temperature range of operation. Photonic Integrated Circuit (PIC)

FIGS. 4A-4C illustrate the PIC 120 in greater detail. FIG. 4A shows the layout of the full PIC 120, including magnified insets. FIGS. 4B and 4C show the diamond integration region 430 of the PIC 120 with the diamond microchiplet 130.

The PIC 120 acts as an interposer that routes optical signals, e.g., at 682 nm and 737 nm, between the fiber array and color centers in the diamond microchiplet. The PIC 120 may include aluminum nitride, silicon nitride, lithium niobate, and or other suitable waveguides on a silicon wafer where the waveguides are exposed (unclad) to allow for heterogeneous integration. The waveguides can be clad or unclad. Unclad waveguides tend to guide small optical modes, which can be efficiently coupled to lensed and/or high numerical aperture fiber. Alternatively, a layer of cladding can produce a large and symmetric mode well-coupled to cleaved optical fiber.

The PIC 120 supports eight independent quantum emitter channels, where each quantum emitter is in or optically coupled to a different independent waveguide in the single diamond microchiplet 130. Sixteen SiN waveguides 422 (channels 4-19 in FIG. 4A) in the PIC 120 provide separate optical input and output access to the quantum emitters in the diamond microchiplet. To ease the alignment of the PIC 120 to an optical fiber array, the input and output SiN waveguides 422 are routed to the same side of the PIC 120 and spaced 127 μm apart as shown in FIG. 4A.

Two SiN waveguide loopback structures 424 (channels 1-3 and 20 in FIG. 4A) that are not routed through the PIC's diamond integration region are routed to the same PIC facet to help facilitate alignment with the fiber array as described above and characterize alignment drift during packaging and cryogenic cooling. In this example, channels 1 and 19 form a long loopback structure and channels 2 and 3 form a short loopback structure. If the channels 1-20 are arrayed along a line segment, then the two loopback structures provide points at different points along the line segment for better alignment to the fiber array 210. Other waveguide arrangements for active alignment are also possible; for instance, the PIC 120 may include waveguides that couple light into free space for detection by a camera or to detectors heterogeneously integrated into the PIC. Detecting light coupled through one or more waveguides in the PIC provides active, real-time feedback during optical alignment.

In addition to optical waveguides 422, the PIC 120 includes metal electrodes 440 fabricated in a 0.75 μm-thick aluminum layer. These electrodes 440 can be used for microwave control of the qubits (color centers/quantum emitters in the diamond microchiplet) and DC strain tuning of the microchiplet. These electrodes 440 can include ground-signal-ground coplanar microwave waveguides routed below the diamond integration region to deliver microwave control signals to the color centers/quantum emitters in the diamond microchiplet. The electrodes 440 can also include DC electrodes interdigitated with the individual diamond waveguides for electrostatic actuation-based strain tuning of the inhomogeneously spread color-center transition frequencies.

The photonic structures on the PIC 120 include linear inverted tapers, bends, and evanescent couplers 450 to get the optical modes into and out of the diamond microchiplet. These evanescent couplers 450 are composed of two parts each: (1) a window transition region 452 composed of a taper from the clad SiN waveguide 422 to the unclad SiN waveguide 422' in the window portion of the diamond integration region 430; and (2) a SiN-to-diamond transition region 454 composed of a linear taper from the unclad SiN waveguide 422' into a diamond waveguide. The details are shown in FIGS. 4B and 4C.

Each window transition region 452 includes a portion of the SiN waveguide 422 that tapers from a 600 nm width in the clad region—section (i) in FIG. 4C—to a 1000 nm width in the unclad region—section (ii). During this taper, the window in the diamond integration region 430 tapers open gradually over a distance of 5 μm—sections (ii) to (iii). The SiN-to-diamond transition is accomplished in the unclad window region, where the unclad SiN waveguide 422' is tapered down while the diamond waveguide 132 is tapered up towards the desired width of 320 nm—section (iv). The optical mode is thus evanescently coupled from the 1000 nm-wide SiN waveguide 422' to the diamond waveguide 132—section (v)—where it can interact with $SiV^-$ color centers in the diamond microchiplet. The losses of the window transition can be 3.3 dB/transition or lower. The losses of the SiN-to-diamond transition can be 6.6 dB/transition or lower. Angular displacements of the diamond microchiplet 130 with respect to SiN waveguides 422 resulting from manual diamond positioning could result in higher insertion losses.

FIG. 5 shows a PIC fabrication process that allows for both SiN waveguides 422 with thick oxide cladding at the facet of the PIC 120 and SiN waveguides 422' without oxide cladding for integration with the diamond microchiplet 130. Such a PIC 120 can be made at wafer scale using a SiN-on-$SiO_2$ plasma enhanced chemical vapor deposition (PECVD) process. As explained above, this PIC 120 includes an aluminum layer (0.75 μm thickness) deposited on a $SiO_2$ substrate 502 and patterned into electrodes 440 for microwave and/or DC control of $SiV^-$ color centers in the diamond microchiplet 130. The electrodes 440 are covered in a 1.5 μm thick $SiO_2$ PECVD cladding 504. The $SiO_2$ cladding 504 is planarized via chemical-mechanical polishing to a total depth of 0.6 μm. The PIC's optical waveguides 422, 422' are etched from a 100-nm-thick SiN layer deposited on the planarized $SiO_2$ cladding as shown in FIG. 5 (I).

As shown in FIG. 5(II), a titanium-aluminum (Ti—Al) etch-stop layer 514 can be deposited on the SiN waveguide cores 422' and exposed planarized $SiO_2$ cladding to aid in the removal of the $SiO_2$ cladding in the diamond integration region(s). This is followed by depositing 5 μm of $SiO_2$ 506 (III) and a standard masked oxide etch to open a window 430 down to the Ti—Al etch-stop layer 514 (IV), followed by a selective wet etch (V) to remove the Ti—Al etch stop layer 514, exposing the unclad SiN waveguides 422' underneath. The diamond microchiplet 130 can be disposed on the unclad SiN waveguides 422' with a polydimethylsiloxane (PDMS) stamp 530 as explained below. The window in the PIC 120 can also be heterogeneously integrated with other components or microchiplets. For example, the PIC 120 can have one or more windows, each of which accommodates one or more chiplets or components.

Vias (not shown) can be patterned and etched to access the electrodes 440 for wire bonding, and a 150 μm-deep and 100 μm-wide trench defines the dicing trenches on four sides of the entire PIC 120, which may be about 4 mm by 5 mm in size. An additional 500 μm-deep etch on the optical input facets of the PIC 120 results in a total etch depth at the facet of 650 μm. This enables the fiber array 210 to come flush against the PIC facet during bonding. The resulting PIC 120 has both clad SiN waveguides 422, unclad SiN waveguides 422', high-quality edge facets, and embedded microwave and DC electrodes 440.

The left side of FIG. 6 shows a scanning electron microscope (SEM) image of the window in the diamond integration region with exposed SiN waveguides. The right side of FIG. 6 shows an optical image of a diamond microchiplet stamped onto the exposed SiN waveguides. The alignment of the diamond waveguides and the microwave and DC electrical lines that can be used to control the electronic states of the $SiV^-$ in the diamond microchiplet are visible in both sides of FIG. 6.

Diamond Microchiplet

The diamond microchiplet 130 includes waveguides containing $SiV^-$ color centers (quantum emitters) and can be fabricated as follows from an electronic grade single-crystal diamond plate. Plasma etching in $Ar/Cl_2$ followed by $O_2$ etching removes 7 μm of the diamond surface of the diamond plate. Removing this material relieves strain in the diamond plate. Next, $^{29}Si$ ions are implanted in the diamond plate, e.g., with an effective areal dose of $10^{11}$ ion/$cm^2$ at 175 keV for a mean depth of 115 nm, to create the $SiV^-$ color centers/quantum emitters 134. After implantation, the diamond plate is annealed, e.g., at 1200° C. in an ultra-high vacuum furnace at $10^{-7}$ mbar, followed by cleaning in a boiling mixture of nitric acid, sulfuric acid, and perchloric acid (1:1:1) to remove any graphite formed during the anneal.

Once implantation is complete, the diamond microchiplets are fabricated from the diamond plate, each of which includes $SiV^-$ color centers 134 either in or optically coupled to diamond waveguides 132. As shown in FIG. 4B, the diamond waveguides 132 taper up linearly, e.g., from approximately 50 nm to 320 nm over 3.0 Each diamond waveguide 132 can have a rectangular shape with a depth of 200 nm and are spaced be 3.0 The resulting diamond microchiplet 130 can be removed with a tungsten probe and placed (smooth-side-up) onto a PDMS stamp 530 for transfer (smooth-side-down) to the PIC 120 as shown in FIG. 5(V).

The diamond microchiplet 130 can be transferred to the PIC 120 after the PIC 120 and fiber array have been bonded to the silicon bench and the cryo-compatible epoxy has been fully cured. During this transfer, the diamond microchiplet 130 and the PIC 120 can be viewed simultaneously through the PDMS 530 stamp using a high-magnification zoom lens. The diamond microchiplet 130 can be aligned with respect to the PIC 120 using a six-axis stage with differential micrometers. Correct diamond alignment with the SiN waveguides can be confirmed at room temperature using photoluminescence (PL) measurements as described below. Based on the sub-micrometer widths of the SiN waveguides, the diamond microchiplet placement accuracy can be better than 100 nm, which compares very favorably with the approximately 10 μm placement accuracy of commercially available pick-and-place systems.

Quantum-Emitter Module Performance Characterization

FIG. 7 shows an experimental setup 700 used for measuring the optical and electrical properties of several fabricated quantum-emitter modules 100. The setup 700 included two laser sources: an off-resonant repump laser **702*a* that emitted light at 638 nm and a resonant excitation laser 702*b* that emitted light at 737 nm. The resonant excitation laser light 702*b* was pulsed using an acousto-optic modulator (AOM) 704, while the off-resonant repump laser 702*a* was pulsed using current control. A 50:50 fiber splitter/combiner 706 coupled the off-resonant repump pulses at 638 nm and the resonant excitation pulses at 737 nm into the fiber array 210 (FIG. 2A), which guided the optical pulses to the quantum-emitter module 100 in the dilution refrigerator (DR) 10. Excitation light was coupled into the quantum-emitter module 100 via one channel of the fiber array 210, into the PIC 120 and then transitioned from the PIC 120 into the diamond chiplet 130, driving color centers in the diamond chiplet 130 to emit fluorescence into the diamond waveguide mode supported by the diamond waveguides in the diamond chiplet 130. This fluorescence transitioned back into the PIC waveguides 422, 422', into the fiber array 210 and out of the DR 10 with co-propagating light from the phonon sideband at 775 nm. Filters 710 spectrally filtered the fluorescence and sent it to either an avalanche photodiode (APD) 712 for time-tagged photon detection or a spectrometer 714 for spectral characterization. The filters 710 included a long pass filter (LPF) that suppressed the repump laser light and a band pass filter (BPF) that passed the phonon side-band. The spectrometer 714 measured photoluminescence and the APD 712** measured photoluminescent excitation.

Suitable figures of merit for characterizing the quantum-emitter module 100 include the optical and microwave losses through the packaged system, the detected photon flux from the $SiV^-$, and the linewidth of the $SiV^-$ emitters. The optical insertion loss of the PIC was characterized using the short loopback waveguide structure 424, which did not pass through the diamond window on the PIC 120. The measured round-trip insertion loss was approximately 7 dB at 737 nm, which included facet, propagation, and bend losses. The facet loss was estimated to be approximately 3 dB/facet at 737 nm. The insertion loss was stable from room temperature down to 100 mK with no active alignment. This compares favorably to the room-temperature stability of bi-layer SiN waveguides at 940 nm. The quantum-emitter module 100 was cycled between room temperature and below 100 mK multiple times with no appreciable change in transmission.

The fabricated PIC parameters were swept to explore the PIC geometry and to reveal relevant fabrication limitations. Using cascaded test devices, the best-performing window structures had approximately 3.0 dB loss per transition. This loss was primarily due to optical scattering as the waveguide passed directly through window etch, which can have a rough surface. This fabrication limitation can be overcome by switching to a two-layer SiN stack and adiabatically transitioning between SiN layers within the window region. This significantly reduces the window transition loss and allows for polarization control and low-loss optical routing.

The PICs with the best-performing SiN-to-diamond transition regions had 6.6 dB loss per transition. Loss in these PICs arose from the SiN waveguide layer thickness—which was optimized for edge coupling performance between the PIC and the cleaved fiber array—resulting in imperfect mode matching between the SiN and diamond waveguides. Edge coupling can be improved by switching to a two-layer SiN stack for the SiN waveguides, where the bottom layer thickness is selected for cleaved fiber to PIC transmission performance and the top layer thickness is selected for SiN-to-diamond waveguide transmission performance. A 600 nm wide straight waveguide could have a propagation loss of 0.30 dB/cm at 737 nm, which could be improved by increasing the waveguide width from 600 nm to 700 nm. There is increased loss near metals (e.g., electrodes 440) in or on the PIC, though this can be mitigated by increasing the oxide depth between the SiN and metal layer to move the metal layer farther from the optical mode.

FIGS. 8A-8D show optical and electrical characterizations of an example quantum-emitter module. FIG. 8A shows the energy level diagram of an $SiV^-$ color center with zero magnetic field. The excited state (e) and ground state (g) are split by spin-orbit coupling. The resulting manifold contains optical transitions (A-D) and microwave transitions ($\Delta_e$ and $\Delta_g$). FIG. 8B shows a typical PL signal from an ensemble of color centers in a single waveguide using 638 nm excitation light with transitions labeled according to FIG. 8A. The excitation light was a continuous-wave beam with approximately 5.2 μW of power in the diamond waveguide (calculated based upon known losses) and an integration time of two minutes with a background-subtracted count rate of 2.8 kHz. The output was filtered using a long-pass interference filter at 664 nm. FIG. 8B shows two 737 nm transitions due to the excited state splitting of the $SiV^-$ as shown FIG. 8A. Similar results were found in all six transmitting waveguides in the quantum-emitter module (the other two waveguides in the quantum-emitter module may have been damaged during or after fabrication and hence did not transmit).

FIG. 8C is a high-resolution PLE scan of one $SiV^-$ using resonant 737 nm and 638 nm repump laser light and collecting the phonon sideband. For this scan, the repump laser initialized the $SiV^-$ electronic state with a 500 ns pulse with a peak power of 4.1 μW in the diamond waveguide. After a period of 1.6 μs, a 10 μs resonant 737 nm pulse with a peak power of 440 pW in the diamond waveguide was applied to cycle the resonant transition. The optical power of each pulse was calculated based upon known losses. Each full optical pulse cycle was 16.1 μs long and included 10 μs of measurement time during the resonant pulse. The output light was filtered to collect the phonon sideband with two 46 nm bandpass filters centered at 775 nm. The resonant laser frequency was swept with emitted phonon sideband photon counts measured by the APD for many pulse cycles, ranging between $2.50\times10^5$ and $6.21\times10^5$ cycles, depending on the channel. FIG. 8C shows the scan for an individual $SiV^-$ resonance including a Lorentzian fit with a full width at half maximum of 108±11 MHz. These results confirm that the packaged quantum-emitter module supported individual color center characterization for use in a quantum memory.

FIG. 8D shows S-parameters of the microwave transmission properties of a typical quantum-emitter module. This data was taken at room temperature. There were minimal changes in microwave transmission characteristics between room-temperature operation and cryogenic operation. The data shows smooth transmission properties out to 10 GHz, indicating the quantum-emitter module can deliver distortion-free microwave pulses to the $SiV^-$ color centers in the quantum-emitter module, suitable for enabling quantum memory control operations. The transmission loss is dominated by line-loss from the cables, not by the quantum-emitter module itself, which should result in little to no heating of the diamond microchiplet.

FIG. 9 shows PLE signals measured on six diamond channels using the experimental setup 700 in FIG. 7 and the pulse sequence described above with respect to FIG. 8C. The PLE data was taken over integration times varied from 2.50 seconds up to 6.20 seconds ($2.50\times10^5$ cycles to $6.21\times10^5$ cycles) to ensure adequate signal-to-noise ratios based upon the brightness of the individual emitter. The results in FIG. 9 are shown on an arbitrary vertical axis. Each plot is of the Lorentzian full width at half maximum $\Gamma$ as well as the shift in center frequency $\Delta$ relative to the center frequency of the data in FIG. 8C. The data show that the quantum emitters are within a 12 GHz range, with linewidths varying from 108 MHz up to 229 MHz.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method comprising:

bonding a photonic integrated circuit (PIC) made of substrate material to a support structure made of the substrate material with a first portion of cryo-compatible epoxy;

aligning optical fibers in a V-groove array made of the substrate material to waveguides in the PIC;

bonding the V-groove array to the support structure with a second portion of cryo-compatible epoxy;

bonding the V-groove array to the PIC with epoxy having a shorter cure time than a cure time of the cryo-compatible epoxy;

curing the epoxy to secure the V-groove array to the PIC; and curing the first portion and the second portion of cryo-compatible epoxy.

2. The method of claim 1, wherein the substrate material is silicon.

3. The method of claim 1, wherein bonding the PIC to the support structure comprises:

bonding the PIC to a shim made of the substrate material with the first portion of cryo-compatible epoxy; and bonding the shim to the support structure with a third portion of cryo-compatible epoxy.

4. The method of claim 3, wherein the second portion of cryo-compatible epoxy forms a layer of approximately equal in thickness to a sum of a thickness of a layer formed by the first portion of cryo-compatible epoxy and a thickness of a layer formed by the third portion of cryo-compatible epoxy.

5. The method of claim 1, wherein aligning the optical fibers in the V-groove array to the waveguides in the PIC comprises sensing light coupled through a waveguide in the PIC.

6. The method of claim 1, wherein bonding the V-groove array to the support structure comprises:

after aligning the optical fibers in the V-groove array to the waveguides in the PIC, moving the V-groove array away from the PIC;

applying the second portion of cryo-compatible epoxy to at least one of a surface of the V-groove array or a surface of the support structure; and re-aligning the optical fibers in the V-groove array to the waveguides in the PIC.

7. The method of claim 1, wherein the epoxy is ultraviolet-curable epoxy and curing the ultraviolet-curable epoxy comprises illuminating the ultraviolet-curable epoxy with ultraviolet light.

8. The method of claim 1, wherein curing the first portion and the second portion of cryo-compatible epoxy occurs at room temperature.

9. The method of claim 1, further comprising:

integrating a diamond microchiplet with the PIC.

10. The method of claim 9, wherein integrating the diamond microchiplet with the PIC comprises aligning a waveguide in the diamond microchiplet to a waveguide in the PIC.

11. A fiber block-chip assembly comprising:

a support structure made of substrate material;

a photonic integrated circuit (PIC) made of the substrate material, comprising a plurality of waveguides, and bonded to the support structure with cryo-compatible epoxy;

a V-groove array made of the substrate material, holding a plurality of optical fibers, and bonded to the support structure with additional cryo-compatible epoxy; and epoxy with a cure time shorter than a cure time of the cryo-compatible epoxy bonding the PIC to the V-groove array.

12. The fiber block-chip assembly of claim 11, wherein the substrate material is silicon.

13. The fiber block-chip assembly of claim 11, wherein the PIC comprises a plurality of loopback waveguides for alignment of the plurality of waveguides in the PIC to the plurality of optical fibers held by the V-groove array.

14. The fiber block-chip assembly of claim 11, wherein the epoxy is index-matching epoxy.

15. The fiber block-chip assembly of claim 11, further comprising:

a shim made of the substrate material, bonded to the PIC with a first portion of the cryo-compatible epoxy, and bonded to the support structure with a second portion of the cryo-compatible epoxy.

16. The fiber block-chip assembly of claim 15, wherein the PIC overhangs the shim and the epoxy is not bonded to the support structure.

17. The fiber block-chip assembly of claim 15, wherein the additional cryo-compatible epoxy forms a layer of approximately equal in thickness to a sum of a thickness of a layer formed by the first portion of cryo-compatible epoxy and a thickness of a layer formed by the second portion of cryo-compatible epoxy.

18. The fiber block-chip assembly of claim 15, wherein the epoxy comprises an ultraviolet (UV) curable epoxy.

19. The fiber block-chip assembly of claim 11, further comprising:

a diamond microchiplet heterogeneously integrated with the PIC.

20. The fiber block-chip assembly of claim 19, wherein the diamond microchiplet comprises a plurality of qubits in optical communication with the plurality of optical fibers via the plurality of waveguides in the PIC.

* * * * *